United States Patent [19]

Davies et al.

[11] Patent Number: 4,756,685
[45] Date of Patent: Jul. 12, 1988

[54] STRIP EDGE HEATING BURNER

[75] Inventors: Derek R. Davies, Bramhall; Philip J. Young, Wrexham, both of England

[73] Assignee: Nordsea Gas Technology & Air Products Limited, England

[21] Appl. No.: 938,197

[22] Filed: Dec. 5, 1986

[30] Foreign Application Priority Data

Dec. 6, 1985 [GB] United Kingdom ............. 8530154

[51] Int. Cl.$^4$ .............................................. F23D 11/36
[52] U.S. Cl. .................................... 431/160; 431/179; 239/425; 239/132.3
[58] Field of Search ............................. 431/328, 160; 239/132.1, 132.3, 423, 424, 424.5, 425; 138/111, 114, DIG. 11; 366/336, 340; 285/133.1, 189, 192

[56] References Cited

U.S. PATENT DOCUMENTS

| | | | |
|---|---|---|---|
| 1,721,381 | 7/1929 | Ellis | 239/425 |
| 2,911,035 | 11/1959 | Nieman et al. | 239/423 |
| 3,204,682 | 9/1965 | Teleshefsky et al. | 239/424.5 |
| 3,814,327 | 6/1974 | Dada | 239/424 |
| 4,666,397 | 5/1987 | Wenning et al. | 239/132.3 |

Primary Examiner—Samuel Scott
Assistant Examiner—Noah P. Kamen
Attorney, Agent, or Firm—James C. Simmons; William F. Marsh

[57] ABSTRACT

A burner 10 for the edge heating of strip metal travelling between a furnace and a rolling mill comprises a body 12 having two chambers 16, 18 separated by a dividing wall 14. A multiplicity of square tubes 24 connect the first chamber 16 with an upper surface 26. The tubes 24 project through the second chamber and are located in corresponding circular holes 30 such that a gap is provided around the tube. The first chamber 16 has gas inlets 20, provided with baffles to ensure dispersion of the gas within the chamber 16, and the second chamber 18 is provided with oxygen inlets 28. Thus a gas entering the first chamber 16 via the inlet 20 and leaving through the tubes 24 mixes with the oxygen on the upper surface 26, the oxygen leaving the body 12 via the holes 30. A cooling jacket 34 supplied with cold water acts as a barrier to increase flame stability and cool the burner which can heat up due to back radiation from the surface to be heated.

6 Claims, 3 Drawing Sheets

STRIP EDGE HEATING BURNER

FIELD OF THE INVENTION

This invention concerns burners for heating the edges of a steel strip prior to rolling.

BACKGROUND OF THE INVENTION

In a hot strip mill a hot steel strip travels along rollers from a heating furnace to a rolling mill. During the time taken to travel this distance a certain amount of cooling will take place which will result in the exposed surfaces of the steel strip having a lower temperature than the interior of the strip. This cooling effect is most pronounced at the edges of the strip and it is common to find that the edges are 50° to 70° cooler than the centre of the strip. This cooling has an adverse effect on the steel during the rolling process and can cause the rolled steel produced to have cracked or mis-shapen edges.

In most cases it is not possible to site the furnace adjacent to the rolling mill as a gap has to be provided between the furnace and the rolling mill at least equal to the maximum length of the steel strips produced. This gap will allow the rolling mill to be stopped quickly in the event of a problem occurrring but still allow steel strips to be removed from the furnace.

Known methods of preventing the loss of temperature to the edges of the strip include heating the strip to a higher temperature than normal by increasing the residence time of the strip within the furnace or by operating the furnace at a higher temperature. As the strip will leave the furnace at a high temperature any cooling that takes place will be insufficient to reduce the temperature of the edges to a point at which rolling cannot be performed effectively. However if a larger residence time within the furnace is allowed the process is slowed down correspondingly and if the furnace operating temperature is raised increased costs are incurred as a result of a lower operating efficiency.

A further method is to install secondary heaters, effective on the edges of the strip, immediately prior to the rolling mill. These secondary heaters will raise the temperature of the edges of the strip to an acceptable level for the rolling process to take place. In practice it is known to use such heaters in pairs positioned above and below respective edges of the steel plate. Such secondary heaters are generally inefficient compared to the furnace and the size of the secondary heater is limited by the space between the rollers used to convey the steel strip from the furnace to the rolling mill.

SUMMARY OF THE INVENTION

An object of the present invention is to provide a burner for the edge heating of strip steel of varying widths in a hot strip mill which has the advantage that it can be used singly and with greater efficiency than previous edge burners.

Pursuant hereto the present invention provides a burner having a hollow body within which is a dividing wall thereby forming two chambers, each of said chambers being provided with respectively one or more inlet ports, a multiplicity of tubes connecting the first chamber with an exterior surface of the body and extending through the second chamber, a multiplicity of holes in a wall of the second chamber through which the tubes extend to the exterior surface of the body and which are of sufficient size to allow a gas to flow out of the second chamber around the tubes, and a cooling jacket in contact with the exterior surface of the body and partially forming a wall therearound.

Advantageously the holes are circular in cross-section and the multiplicity of tubes are square in cross-section allowing the four corners of each tube to be in contact with the circumference of each hole and forming a gap around the tube through which a gas can pass.

Preferably each of the gas inlet ports are provided with a baffle so that gas on entering respective chambers is fully dispersed therein.

Advantageously the square tubes are arranged as a rectangular matrix with a spacing of 3 mm or less between the axis of each tube, the matric bring preferably configured so as to produce a flame having a cross-section substantially identical to that of a steel body to be heated.

Preferably the gas supplied to the gas inlet is natural gas and the gas to oxygen ratio is advantageously 2:1.

Preferably the coolant supplied to the cooling jacket is cold water.

The body is advantageously disposed such that the multiplicity of tubes are substantially horizontal and the rectangular matrix is substantially vertical.

The invention will be described further by way of example, with reference to the accompanying drawings, in which:

DESCRIPTION OF THE PREFERRED EMBODIMENT

Figure 1:
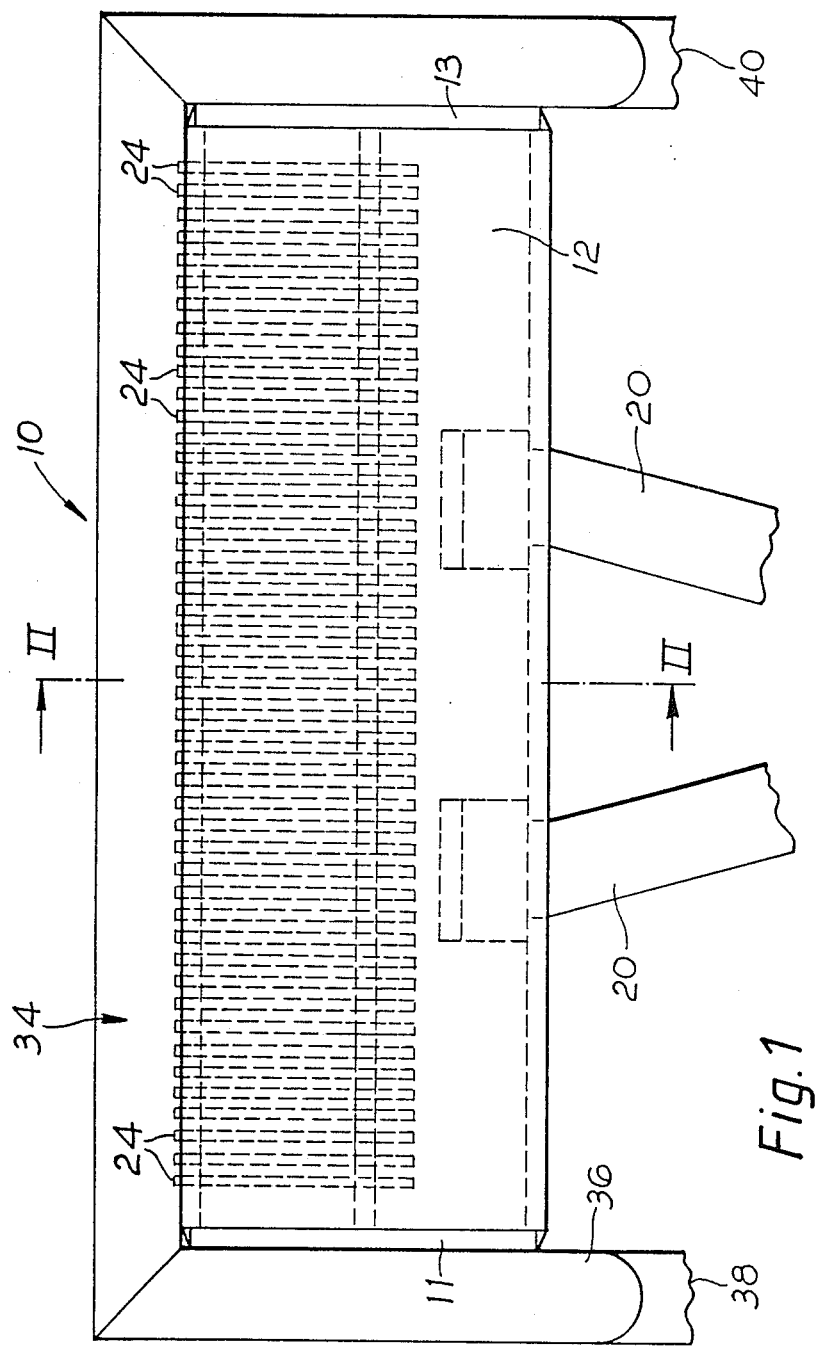
FIG. 1 is a front elevation of a preferred embodiment of the special burner of the invention.
Figure 2:
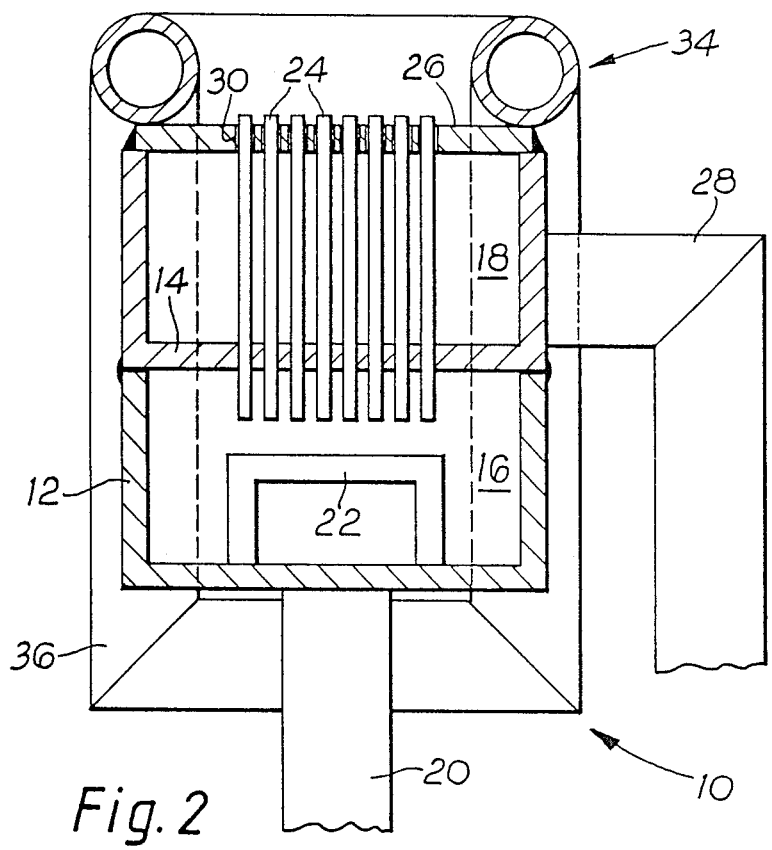
FIG. 2 is a cross-section end view taken along the line II—II of FIG. 1.
Figure 4:
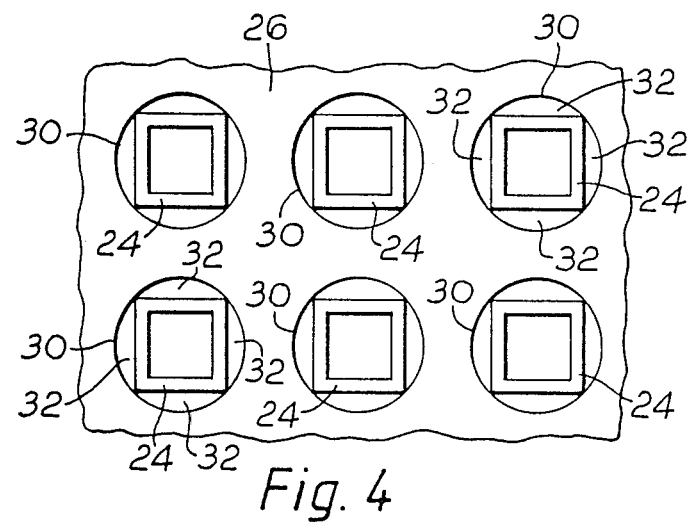
FIG. 4 is an enlarged plan view illustrating in more detail the positioning of the cubes.
Figure 3:
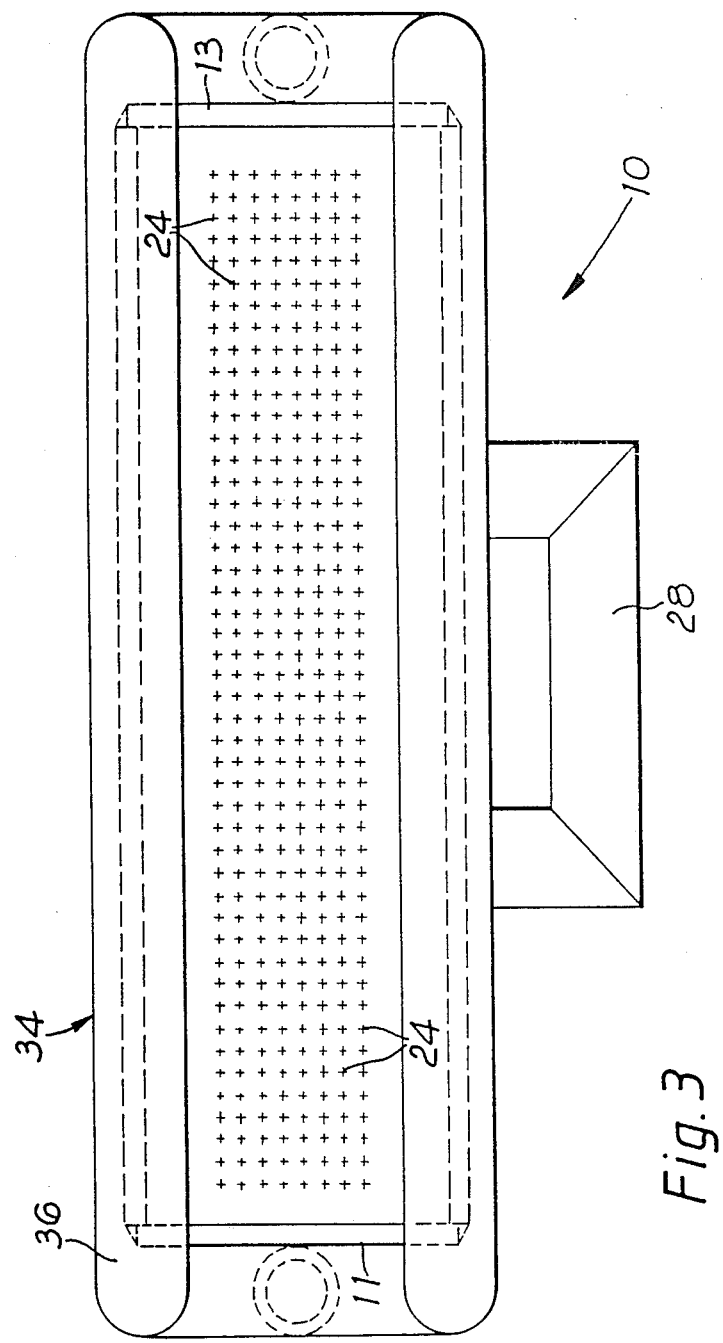
FIG. 3 is a part diagrammatic plan view of FIG. 1.

Referring firstly to FIGS. 1 and 2 which illustrate a preferred embodiment of the invention referred to generally by the reference numeral 10. The burner 10 comprises a hollow body 12 having an upper surface 26 within which is a dividing wall 14 forming a first chamber 16 and a second chamber 18. The first chamber 16 has two gas inlets 20, each provided with a respective baffle 22. An outlet from the chamber 16 is provided in the form of a multiplicity of tubes 24 being square in cross-section which tubes 24 extend from the first chamber 16 through the second chamber 18 and thereby to the upper surface 26 of the body 12 (FIG. 3). The tubes 24 are of a sufficient length to stand proud of the upper surface 26. The tubes 24 are sealed to the dividing wall 14 so that a gas present in the first chamber 16 may only pass through the tubes 24 and not around them. The second chamber 18 has an oxygen inlet 28 and a multiplicity of circular holes 30 in the upper surface 26 of the body 12 thus providing an oxygen outlet. These holes 30 correspond in number and disposition to the tubes 24 which extend from the first chamber 16. The holes 30 are of a diameter such that the tubes 24 extend through them with the corners of each tube 24 in contact with the respective hole's circumference (FIG. 4). Four segmental gaps 32 are thus formed around each tube 24. A cooling jacket 34 formed from a pipe 36 has an inlet 38 and an outlet 40 and is disposed so that a coolant may flow through the jacket 34 and over and around the upper surface 26 and sides 11, 13 of the body 12.

In use a gas, for example natural gas, is introduced into the gas inlets 20. The gas passes through the inlets 20 and is dispersed by the respective baffles 22 within the chamber 16. The gas leaves the chamber 16 through the multiplicity of tubes 24 and hence the gas is passed through the upper surface 26 of the body 12. Oxygen is introduced into the second chamber 18 by way of the oxygen inlet 28 and leaves through the multiplicity of segmental gaps around the tubes 24 in the surface 26. The ratio of oxygen to natural gas is preferably 2:1. On passing through these gaps the oxygen is mixed with the gas and ignited by a pilot burner (not shown). An advantage of this configuration is that accurate positioning of the steel to be heated with respect to the burner is not required.

In the preferred embodiment there are 376 square tubes and a corresponding number of holes. Each tube is 1.5 mm square and the tubes are arranged in a rectangular matrix of 8 rows and 47 columns with 3 mm spaces between the centres of the tubes. In practice it has been found that such an arrangement does not produce 376 individual flames. Instead one sheet of flame is produced over the matrix to a height of about 25 mm. The configuration of the rectangular matrix is such that the flame produced has substantially the same cross section as the steel body to be heated.

The cooling jacket 34 is connected to a water supply (not shown) so that cold water will flow past and/or around the flame. The cooling jacket 34 adds stability to the flame by acting as a wall or shield around the base of the flame which ensures that no air from the surrounding atmosphere can mix with the combustion mixture of natural gas and oxygen. In addition the cooling jacket keeps the body of the burner cool thus increases efficiency.

The burner is mounted so that the multiplicity of tubes are substantially horizontal and the rectangular matrix faces and edge of a steel strip. Ignition of the combustion micture will produce the flame required to heat the strip to the temperature required by the rolling process. The burner matrix is cooled by the flow of oxygen and natural gas and back radiation from the strip is dispersed by the cooling jacket. The burner is not designed to operate at a lower or greater temperature and temperature control is therefore obtained by operating the burner in multiple units, individual burners being shut down or fixed up as required. The degree of control required will depend on the rolling mill. The control is achieved by using radiation thermometers to maintain a check on the temperature of the edges of the strip with resultant temperature measurements being used to dictate the firing patterns of the burner units.

In operation a burner constructed according to the preferred embodiment produces a metal temperature rise of 3.9° C. per second to 7.9° C. per second of residence time of a cold steel strip in the flame. An average performance will be 5° C. per second of residence time although increased heating rates may be caused by extreme edge surface temperature rises.

The invention is not confined to the precise details of the illustrated embodiment and variations are possible. For example although the body of the burner is shown as being rectangular any convenient shape may be used. The number of tubes and the configuration of the matrix may also be varied and although the preferred embodiment is constructed from stainless steel other materials may be used if necessary. The number of inlets to the first and second chambers may be varied as may the size of the tubes and the diameters of the corresponding holes. Furthermore it is possible to use tubes that are not square in cross-section. If the tubes are not square then it may be necessary to provide a lattice-like support frame to ensure that the tubes are centrally located in each hole. The configuration of the cooling jacket may also be varied. The temperature of the edge of the strip may be measured by any suitable device and a radiation thermometer need not be used. The means for controlling the temperature of the flame may be varied as required and the gas oxygen ratio may be varied depending on the characteristics of the gas used. The burner according to the invention may be used for heating forms of rolled metal other than strips, for example billetts, rods and bars. Other variations may also be possible.

We claim:

1. An oxy-fuel strip edge heating burner comprising in combination:
    a generally rectangularly shaped hollow body divided into two chambers having no direct communication;
    a plurality of tubes having a generally square cross-section extending from the first of said chambers through the second of said chambers and beyond an outer surface of said second chamber;
    an equal number of apertures of generally circular cross-section surrounding each of said tubes at said outer surface, said apertures communicating with the interior of said second chamber;
    said tubes and apertures being sized so that the four corners of each tube are in line contact with an inner surface of each aperture to position said tubes in said apertures to create gas passages between said tubes and the inner surface of said apertures;
    means to introduce a first gas into said first chamber and a second gas into said second chamber whereby when said burner is in operation a flame is produced adjacent said outer surface of said second chamber; and
    means to cool said burner.

2. A burner as claimed in claim 1 wherein the means to introduce the gas into the first chamber directs a first gas against a baffle.

3. A burner as claimed in claim 1 in which the means to cool the burner includes a fluid conduit deposited adjacent said outer surface of said second chamber.

4. A burner as claimed in claim 1 in which the tubes are arranged as a rectangular matrix with a spacing of 3 mm or less between the axis of each tube.

5. A burner as claimed in claim 4 wherein the rectangular matrix contains a plurality of parallel rows of tubes having a configuration such as to produce a flame which has a substantially rectangular cross-section whereby said flame can be directed to both sides of an elongated cross section steel body to be heated.

6. A burner as claimed in claim 4 wherein the body is disposed such that the multiplicity of tubes are substantially horizontal and the rectangular matrix thus formed is substantially vertical.

* * * * *